(12) United States Patent
Paulino et al.

(10) Patent No.: US 11,846,249 B1
(45) Date of Patent: Dec. 19, 2023

(54) GAS TURBINE ENGINE WITH INTEGRAL BYPASS DUCT

(71) Applicant: Raytheon Technologies Corporation, Farmington, CT (US)

(72) Inventors: Jose R. Paulino, Jupiter, FL (US); Lawrence A. Binek, Glastonbury, CT (US); Sean R. Jackson, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/902,230

(22) Filed: Sep. 2, 2022

(51) Int. Cl.
*F02K 3/02* (2006.01)
*F02C 3/08* (2006.01)

(52) U.S. Cl.
CPC ............... *F02K 3/02* (2013.01); *F02C 3/085* (2013.01); *F05D 2240/128* (2013.01); *F05D 2240/35* (2013.01); *F05D 2260/606* (2013.01)

(58) Field of Classification Search
CPC .... F02C 3/05; F02C 3/045; F02C 3/08; F23R 3/54
See application file for complete search history.

(56) References Cited

U.S. PATENT DOCUMENTS

| | | | |
|---|---|---|---|
| 1,460,470 A | 7/1923 | Askins | |
| 2,385,833 A | 10/1945 | Nahigyan | |
| 2,616,258 A | 11/1952 | Mock | |
| 2,727,358 A | 12/1955 | Howes | |
| 3,053,461 A | 9/1962 | Inglis | |
| 3,153,323 A | 10/1964 | Hamm | |
| 3,430,443 A | 3/1969 | Richardson | |
| 3,603,711 A | 9/1971 | Downs | |
| 3,693,354 A | 9/1972 | Hull, Jr. | |
| 3,693,889 A | 9/1972 | Schuster | |
| 3,777,983 A | 12/1973 | Hibbins | |
| 3,886,736 A | 6/1975 | Kawaguchi | |
| 3,915,137 A | 10/1975 | Evans | |
| 3,937,007 A | 2/1976 | Kappler | |
| 3,937,013 A * | 2/1976 | Aspinwall | F02K 3/068 60/226.3 |

(Continued)

FOREIGN PATENT DOCUMENTS

EP 3712380 A1 9/2020

OTHER PUBLICATIONS

Zhijun Lei, Ali Mahallati, Mark Cunningham and Patrick Germain, "Influence of Inlet Swirl on the Aerodynamics of a Model Turbofan Lobed Mixer," IMECE2010-39116, Nov. 12-18, 2010. (Year: 2010).*

*Primary Examiner* — Todd E Manahan
*Assistant Examiner* — David P. Olynick
(74) *Attorney, Agent, or Firm* — GETZ BALICH LLC

(57) ABSTRACT

A gas turbine engine is provided that includes an engine core and a bypass duct. The engine core includes a compressor section, a combustor section, a turbine section and a core flowpath. The compressor section includes a radial flow compressor rotor. The core flowpath extends through the compressor section, the combustor section and the turbine section from a core inlet to a core exhaust. The bypass duct includes a bypass flowpath that extends outside of the engine core from a bypass inlet to a bypass exhaust. The bypass inlet is disposed along the compressor section and fluidly coupled with core flowpath.

19 Claims, 9 Drawing Sheets

(56) References Cited

U.S. PATENT DOCUMENTS

| | | | |
|---|---|---|---|
| 4,028,044 A | 6/1977 | Carlisle | |
| 4,081,958 A | 4/1978 | Schelp | |
| 4,134,260 A | 1/1979 | Lefebvre | |
| 4,242,863 A | 1/1981 | Bailey | |
| 4,248,566 A * | 2/1981 | Chapman | F04D 27/0215 |
| | | | 415/26 |
| 4,295,821 A | 10/1981 | Schilling | |
| 4,305,255 A | 12/1981 | Davies | |
| 4,819,423 A | 4/1989 | Vershure, Jr. | |
| 4,981,018 A * | 1/1991 | Jones | F02C 3/08 |
| | | | 60/726 |
| 5,105,616 A * | 4/1992 | Bornemisza | F04D 25/04 |
| | | | 60/726 |
| 5,129,226 A | 7/1992 | Bigelow | |
| 5,133,192 A | 7/1992 | Overton | |
| 5,423,178 A | 6/1995 | Mains | |
| 5,568,721 A | 10/1996 | Alary | |
| 5,836,163 A | 11/1998 | Lockyer | |
| 5,873,237 A | 2/1999 | Medla | |
| 6,183,195 B1 * | 2/2001 | Tremaine | F04D 27/023 |
| | | | 415/173.2 |
| 6,345,441 B1 | 2/2002 | Farmer | |
| 6,438,961 B2 | 8/2002 | Tuthill | |
| 6,460,344 B1 | 10/2002 | Steinthorsson | |
| 6,490,864 B1 | 12/2002 | Joos | |
| 6,502,480 B1 | 1/2003 | Walker | |
| 6,672,066 B2 | 1/2004 | Wrubel | |
| 6,931,862 B2 | 8/2005 | Harris | |
| 7,194,866 B1 | 3/2007 | Jones | |
| 7,870,736 B2 | 1/2011 | Homitz | |
| 7,891,191 B2 | 2/2011 | Yoshida | |
| 7,954,328 B2 | 6/2011 | Atassi | |
| 8,387,357 B2 | 3/2013 | Jewess | |
| 9,062,609 B2 | 6/2015 | Mehring | |
| 9,383,145 B2 | 7/2016 | Weber | |
| 9,803,498 B2 | 10/2017 | Jewess | |
| 10,570,865 B2 | 2/2020 | Zhang | |
| 10,619,855 B2 | 4/2020 | Brogan | |
| 10,739,005 B2 | 8/2020 | Kironn | |
| 10,816,207 B2 | 10/2020 | Fryer | |
| 10,976,053 B2 | 4/2021 | Boardman | |
| 11,118,784 B2 | 9/2021 | Sweeney | |
| 11,156,156 B2 | 10/2021 | Binek | |
| 11,199,136 B2 | 12/2021 | Butcher | |
| 2002/0069645 A1 | 6/2002 | Mowill | |
| 2004/0226297 A1 | 11/2004 | Griffin | |
| 2006/0213180 A1 | 9/2006 | Koshoffer | |
| 2007/0044476 A1 | 3/2007 | Koshoffer | |
| 2008/0201008 A1 | 8/2008 | Twelves, Jr. | |
| 2009/0020266 A1 | 1/2009 | Weber | |
| 2009/0255264 A1 | 10/2009 | McMasters | |
| 2009/0260365 A1 | 10/2009 | Muldoon | |
| 2010/0050653 A1 | 3/2010 | Lam | |
| 2010/0281871 A1 | 11/2010 | Hadley | |
| 2011/0289928 A1 | 12/2011 | Fox | |
| 2011/0296839 A1 | 12/2011 | Van Nieuwenhuizen | |
| 2012/0304648 A1 | 12/2012 | Byrne | |
| 2013/0000324 A1 | 1/2013 | Alvanos | |
| 2013/0098048 A1 | 4/2013 | Popovic | |
| 2014/0035240 A1 | 2/2014 | Shaik | |
| 2015/0020528 A1 | 1/2015 | Fuller | |
| 2016/0209041 A1 | 7/2016 | Twelves, Jr. | |
| 2017/0089264 A1 | 3/2017 | Jones | |
| 2020/0109663 A1 * | 4/2020 | Binek | F02K 3/10 |
| 2020/0109668 A1 * | 4/2020 | Butcher | F02C 7/04 |
| 2020/0123919 A1 | 4/2020 | Hall | |
| 2020/0182467 A1 * | 6/2020 | Binek | F02C 3/14 |
| 2020/0362724 A1 * | 11/2020 | Binek | F23R 3/54 |
| 2020/0398386 A1 | 12/2020 | Binek | |
| 2021/0025593 A1 | 1/2021 | Ryon | |

* cited by examiner

GAS TURBINE ENGINE WITH INTEGRAL BYPASS DUCT

BACKGROUND OF THE DISCLOSURE

1. Technical Field

This disclosure relates generally to a gas turbine engine and, more particularly, to a bypass duct for the gas turbine engine.

2. Background Information

A gas turbine engine may include a bypass duct which directs gas around one or more sections of an engine core. Various types and configurations of gas turbine engines with bypass ducts are known in the art. While these known gas turbine engines have various benefits, there is still room in the art for improvement.

SUMMARY OF THE DISCLOSURE

According to an aspect of the present disclosure, a gas turbine engine is provided that includes an engine core and a bypass duct. The engine core includes a compressor section, a combustor section, a turbine section and a core flowpath. The compressor section includes a radial flow compressor rotor. The core flowpath extends through the compressor section, the combustor section and the turbine section from a core inlet to a core exhaust. The bypass duct includes a bypass flowpath that extends outside of the engine core from a bypass inlet to a bypass exhaust. The bypass inlet is disposed along the compressor section and fluidly coupled with core flowpath.

According to another aspect of the present disclosure, an assembly is provided for a gas turbine engine. This assembly includes an engine core and a stationary structure. The engine core includes a compressor section, a combustor section, a turbine section and a core flowpath. The core flowpath extends through the compressor section, the combustor section and the turbine section from a core inlet to a core exhaust. The stationary structure includes a combustor and a bypass duct. The combustor is within the combustor section. The bypass duct includes a bypass flowpath that extends outside of the engine core from a bypass inlet to a bypass exhaust. The bypass inlet is disposed along and fluidly coupled with core flowpath. At least a section of the stationary structure is formed as a monolithic body. The section of the stationary structure includes the combustor and at least a section of the bypass duct axially overlapping the combustor.

According to still another aspect of the present disclosure, another assembly is provided for a gas turbine engine. This assembly includes an engine core and a stationary structure. The engine core includes a compressor section, a combustor section, a turbine section and a core flowpath. The core flowpath extends through the compressor section, the combustor section and the turbine section from a core inlet to a core exhaust. The stationary structure includes a combustor, a bypass duct and a lobed mixer. The combustor is within the combustor section. The bypass duct includes a bypass flowpath that extends outside of the engine core from a bypass inlet to a bypass exhaust. The mixer is arranged at an interface between the core exhaust and the bypass exhaust. At least a section of the stationary structure is formed as a monolithic body. The section of the stationary structure includes the combustor and the lobed mixer.

The section of the stationary structure may also include: a diffuser between the compressor section and the combustor section; and/or a nozzle between the combustor section and the turbine section.

The section of the stationary structure may also include: an exhaust duct fluidly coupled with and downstream of the core flowpath and the bypass flowpath; and/or a mixer at an interface between the core exhaust and the bypass exhaust.

A second section of the stationary structure may be formed as a second monolithic body. The second section of the stationary structure may include an inlet structure, a compressor wall and a second section of the bypass duct axially overlapping the compressor wall. The inlet structure may form the core inlet. The compressor wall may at least partially house a compressor rotor within the compressor section.

The bypass inlet may be disposed along the compressor section.

The bypass inlet may be disposed along the radial flow compressor rotor.

The gas turbine engine/the assembly may also include a wall forming an outer peripheral boundary of the core flowpath within the compressor section. The bypass inlet may include one or more arcuate slots extending through the wall.

The gas turbine engine/the assembly may also include a wall forming an outer peripheral boundary of the core flowpath within the compressor section. The bypass inlet may include an annular slot extending through the wall.

The gas turbine engine/the assembly may also include a flow regulator configured to regulate gas flow from the core flowpath into the bypass flowpath.

The flow regulator may be arranged at the bypass inlet.

The bypass flowpath may bypass the combustor section and the turbine section.

The gas turbine engine/the assembly may also include an exhaust duct fluidly coupled with and downstream of the core exhaust and the bypass exhaust.

The gas turbine engine/the assembly may also include a lobed mixer within the exhaust duct at an interface between the core exhaust and the bypass exhaust.

The combustor section may be configured as or otherwise include a reverse flow combustor. In addition or alternatively, the turbine section may be configured as or otherwise include a radial flow turbine rotor.

The gas turbine engine/the assembly may also include a monolithic body. The monolithic body may include a diffuser, a combustor and a nozzle. The diffuser may be between the compressor section and the combustor section. The combustor may be within the combustor section. The nozzle may be between the combustor section and the turbine section. At least a section of the bypass duct may be radially outboard of the diffuser, the combustor and the nozzle.

The monolithic body may also include a lobe mixer at an interface between the core exhaust and the bypass exhaust.

The turbine section may include a turbine rotor. The monolithic body may also include a turbine wall at least partially housing the turbine rotor.

The gas turbine engine/the assembly may also include a second monolithic body. The second monolithic body may include an inlet structure, a compressor wall and a second section of the bypass duct radially outboard of the compressor wall. The inlet structure may form the core inlet. The compressor wall may at least partially house the radial flow compressor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
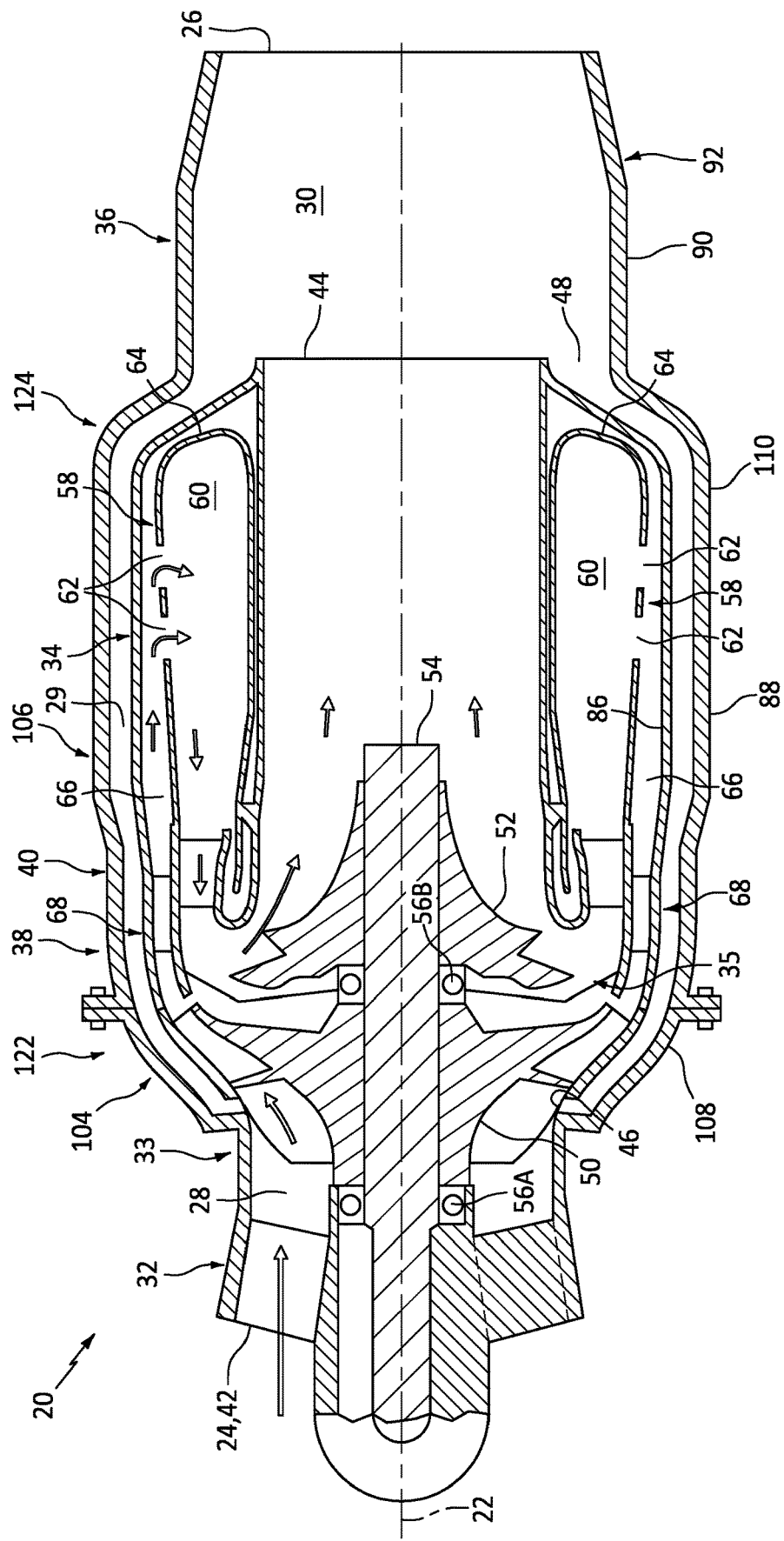
FIG. 1 is a schematic side sectional illustration of a gas turbine engine.

FIG. 1 is a side sectional illustration of a gas turbine engine 20. The gas turbine engine 20 of FIG. 1 is configured as a single spool, radial-flow turbojet gas turbine engine. This gas turbine engine 20 is configured for propelling an aircraft such as, but not limited to, an airplane, a drone (e.g., an unmanned aerial vehicle (UAV)), a spacecraft or any other manned or unmanned aerial vehicle. The present disclosure, however, is not limited to such an exemplary turbojet turbine engine configuration nor to an aircraft propulsion system application. For example, the gas turbine engine 20 may alternatively be configured as an auxiliary power unit (APU) or an industrial gas turbine engine.

The gas turbine engine 20 of FIG. 1 extends axially along an axial centerline 22 from a forward, upstream inlet 24 into the gas turbine engine 20 to an aft, downstream exhaust 26 from the gas turbine engine 20. This axial centerline 22 may also be a rotational axis for various components within the gas turbine engine 20.

The gas turbine engine 20 includes a plurality of flowpaths 28-30, an inlet section 32, a (e.g., radial flow) compressor section 33, a (e.g., reverse flow) combustor section 34, a (e.g., radial flow) turbine section 35 and an exhaust section 36. The gas turbine engine 20 also includes a stationary structure 38 housing and/or forming one or more or all of the engine sections 32-36. This stationary structure 38 also forms a bypass duct 40 outside of a core of the gas turbine engine 20, which engine core is formed by or otherwise includes the compressor section 33, the combustor section 34 and the turbine section 35.

The core flowpath 28 extends within the gas turbine engine 20 from an inlet 42 to the engine core to an exhaust 44 from the core flowpath 28. More particularly, the core flowpath 28 of FIG. 1 extends sequentially through the inlet section 32, the compressor section 33, the combustor section 34 and the turbine section 35 to the exhaust section 36. The core inlet 42 may be the same as the engine inlet 24.

The bypass flowpath 29 is formed by the bypass duct 40, and may have an annular cross-sectional geometry. The bypass flowpath 29 extends outside of the engine core from an inlet 46 to the bypass flowpath 29 to an exhaust 48 from the bypass flowpath 29. More particularly, the bypass flowpath 29 of FIG. 1 extends through the bypass duct 40 from the compressor section 33 to the exhaust section 36. The bypass inlet 46 may be arranged along the compressor section 33. The bypass inlet 46 is fluidly coupled with and radially outboard of the core flowpath 28. The bypass exhaust 48 is radially outboard of the core exhaust 44, and the bypass exhaust 48 may be axially aligned with the core exhaust 44 along the axial centerline 22.

The exhaust flowpath 30 is fluidly coupled (e.g., in parallel) with and downstream of the core flowpath 28 and the bypass flowpath 29. More particularly, the exhaust flowpath 30 of FIG. 1 extends through the exhaust section 36 from the core exhaust 44 and the bypass exhaust 48 to the engine exhaust 26.

The compressor section 33 includes a bladed compressor rotor 50. The turbine section 35 includes a bladed turbine rotor 52. Each of these engine rotors 50 and 52 includes a plurality of rotor blades arranged circumferentially around and connected to at least one respective rotor disk or hub. The rotor blades, for example, may be formed integral with or mechanically fastened, welded, brazed, adhered and/or otherwise attached to the respective rotor disk(s) or hub(s).

The compressor rotor 50 may be configured as a radial flow compressor rotor, and the compressor section 33 may be configured as a radial flow compressor section. The turbine rotor 52 may be configured as a radial flow turbine rotor, and the turbine section 35 may be configured as a radial flow turbine section. The compressor rotor 50 is connected to the turbine rotor 52 through an engine shaft 54. This engine shaft 54 is rotatably supported by the stationary structure 38 through a plurality of bearings 56A and 56B (generally referred to as 56); e.g., rolling element bearings, journal bearings, etc.

The combustor section 34 includes an annular combustor 58 with an annular combustion chamber 60. The combustor 58 of FIG. 1 is configured as a reverse flow combustor. Inlets ports/flow tubes 62 into the combustion chamber 60, for example, may be arranged at (e.g., on, adjacent or proximate) and/or towards an aft bulkhead wall 64 of the combustor 58. An outlet from the combustor 58 may be arranged axially aft of an inlet to the turbine section 35. The combustor 58 may also be arranged radially outboard of and/or axially overlap at least a (e.g., aft) portion of the turbine section 35. With this arrangement, the core flowpath 28 of FIG. 1 reverses direction (e.g., from a forward-to-aft direction to an aft-to-forward direction) a first time as the core flowpath 28 extends from a diffuser plenum 66 surrounding the combustor 58 into the combustion chamber 60. The core flowpath 28 of FIG. 1 then reverses direction (e.g., from the aft-to-forward direction to the forward-to-aft direction) a second time as the core flowpath 28 extends from the combustion chamber 60 into the turbine section 35.

During operation, air enters the gas turbine engine 20 through the inlet section 32 and its engine inlet 24/the core inlet 42. The inlet section 32 directs the air from the engine inlet 24/the core inlet 42 into the core flowpath 28 and the compressor section 33. The air entering the core flowpath 28 may be referred to as core air. This core air is compressed by the compressor rotor 50. At least some (or all during certain mode(s) of operation) of this compressed core air is directed through a diffuser 68 and its plenum 66 into the combustion chamber 60. Fuel is injected and mixed with the compressed core air to provide a fuel-air mixture. This fuel-air mixture is ignited within the combustion chamber 60, and combustion products thereof flow through the turbine section 35 and cause the turbine rotor 52 to rotate. The rotation of the turbine rotor 52 drives rotation of the compressor rotor 50 and, thus, compression of the air received from the engine inlet 24/the core inlet 42. Concurrently, some of the compressed core air may also (or may not during certain mode(s) of operation) be directed into the bypass flowpath 29 to (e.g., completely) bypass the combustor section 34 and the turbine section 35, which may facilitate more fuel efficient gas turbine engine operation. The compressed core air entering the bypass flowpath 29 may be referred to as bypass air. The exhaust section 36 may receive the combustion products from the turbine section 35 through the core exhaust 44 and the bypass air from the bypass duct 40 through the bypass exhaust 48. The exhaust section 36 directs a mixture of the combustion products and bypass air out of the gas turbine engine 20 to provide forward engine thrust.

The stationary structure 38 of FIG. 1 may include some or all stationary engine components included in the gas turbine engine 20. Herein, the term "stationary" may describe a component that does not rotate with the rotating assembly (e.g., an assembly of the compressor rotor 50, the turbine rotor 52 and the engine shaft 54) during gas turbine engine operation. A stationary component, for example, may refer to any component that remains stationary during gas turbine engine operation such as, but not limited to, a wall, a liner, a strut, a fixed vane, a fuel nozzle, a conduit, etc.

Figure 2:
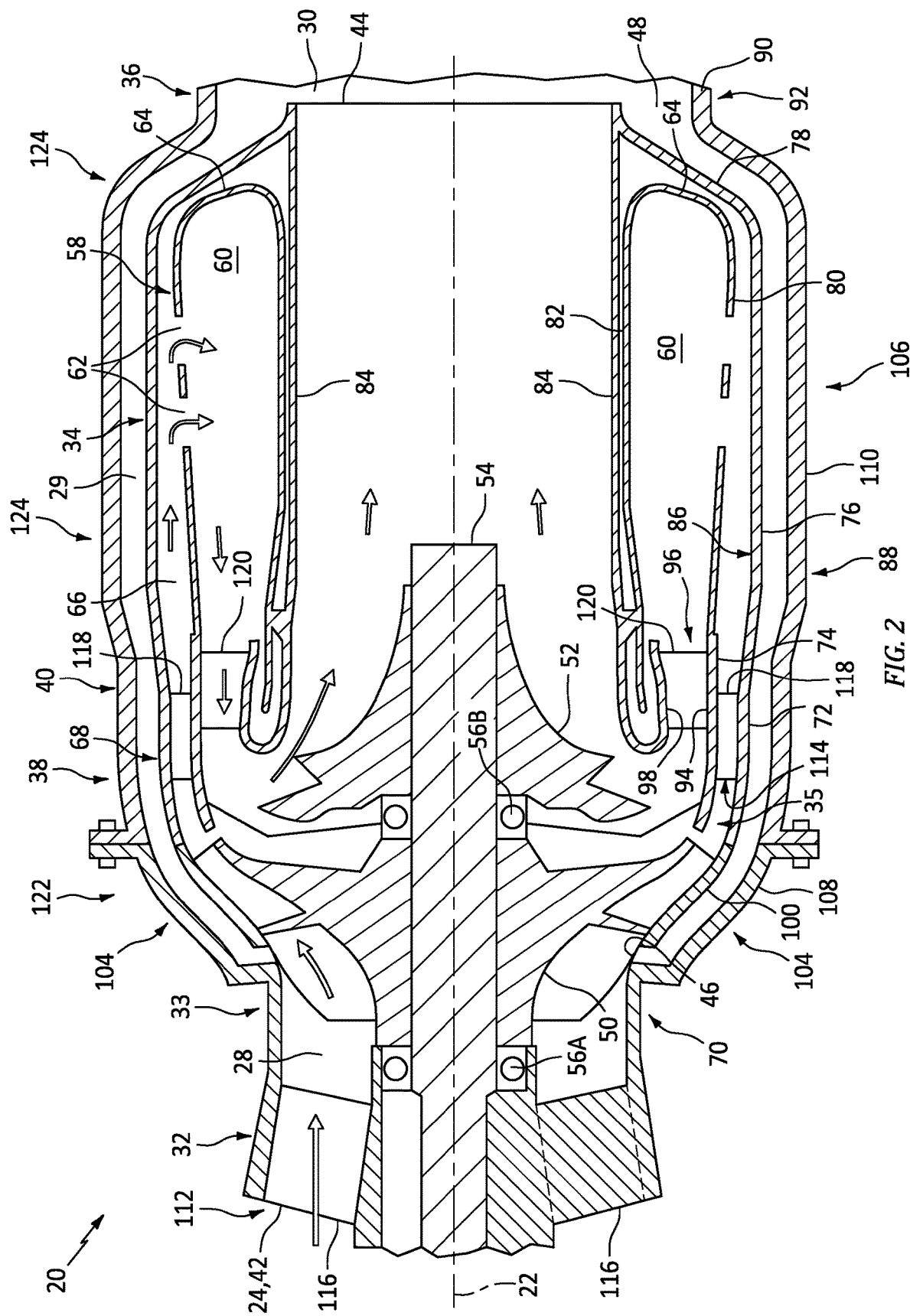
FIG. 2 is a schematic side sectional illustration of a central portion of the gas turbine engine.

Referring to FIG. 2, the stationary structure 38 includes one or more case walls. The stationary structure 38 of FIG. 2, for example, includes an outer compressor wall 70, an outer diffuser wall 72 of the diffuser 68, an inner diffuser wall 74 of the diffuser 68, a plenum side (e.g., outer) wall 76, a plenum end wall 78, an outer combustor wall 80 of the combustor 58, an inner combustor wall 82 of the combustor 58, the bulkhead wall 64 of the combustor 58, an inner turbine wall 84 of a turbine duct, an inner bypass wall 86 of the bypass duct 40, an outer bypass wall 88 of the bypass duct 40, and an exhaust wall 90 of an exhaust duct 92 (see also FIG. 1). At least a portion or an entirety of each of the case walls 70, 72, 74, 76, 80, 82, 84, 86, 88 and/or 90 of FIG. 2, for example, is generally tubular. At least a portion or an entirety of each of the case walls 64 and/or 78 of FIG. 2 is generally annular.

The compressor wall 70 extends axially along the axial centerline 22 between and is connected to the inlet section 32 and the outer diffuser wall 72. The compressor wall 70 of FIG. 2 circumscribes, axially overlaps and thereby houses the compressor rotor 50. This compressor wall 70 forms an outer peripheral boundary of the core flowpath 28 through the compressor section 33.

The outer diffuser wall 72 extends axially along the axial centerline 22 between and is connected to the compressor wall 70 and the plenum side wall 76. The outer diffuser wall 72 is spaced radially outboard from, axially overlaps and circumscribes the inner diffuser wall 74. The outer diffuser wall 72 of FIG. 2 thereby forms an outer peripheral boundary of the core flowpath 28 through the diffuser 68.

The inner diffuser wall 74 may be connected to the outer combustor wall 80. The inner diffuser wall 74 of FIG. 2, for example, projects axially out from the outer combustor wall 80 and extends axially towards (e.g., to) an aft, downstream end of an inner platform of the compressor rotor 50. This inner diffuser wall 74 forms an inner peripheral boundary of the core flowpath 28 within the diffuser 68. The inner diffuser wall 74 may also be configured as an outer turbine wall. The inner diffuser wall 74 of FIG. 2, for example, may also form an outer peripheral boundary of the core flowpath 28 within a (e.g., upstream) portion of the turbine section 35. The inner diffuser wall 74 of FIG. 2 circumscribes, axially overlaps and may thereby house a (e.g., upstream) portion of the turbine rotor 52.

The plenum side wall 76 extends axially along the axial centerline 22 between and is connected to the outer diffuser wall 72 and the plenum end wall 78. The plenum side wall 76 of FIG. 2 circumscribes, axially overlaps and thereby houses the combustor 58 and its outer combustor wall 80. The plenum side wall 76 is radially spaced outward from the combustor 58 and its outer combustor wall 80. The plenum side wall 76 forms an outer peripheral boundary of the plenum 66.

The plenum end wall 78 extends radially (and axially along the axial centerline 22) between and is connected to the plenum side wall 76 and the turbine wall 84. The plenum end wall 78 is axially spaced from the combustor 58 and its bulkhead wall 64. The plenum end wall 78 forms an axial end peripheral boundary of the plenum 66.

The outer combustor wall 80 extends axially along the axial centerline 22 between and may be connected to the bulkhead wall 64 and the inner diffuser wall 74. More particularly, the outer combustor wall 80 extends axially to and may be connected to an outer platform 94 of a turbine nozzle 96; e.g., an exit nozzle from the combustion chamber 60. This nozzle outer platform 94 of FIG. 2 is configured as part of the inner diffuser wall 74; however, the nozzle outer platform 94 and the inner diffuser wall 74 may be discrete from one another in alternative embodiments.

The inner combustor wall 82 is connected to the bulkhead wall 64. This inner combustor wall 82 projects axially along the axial centerline 22 out from the bulkhead wall 64 towards the turbine nozzle 96 and its inner platform 98.

The bulkhead wall 64 extends radially between the outer combustor wall 80 and the inner combustor wall 82. The bulkhead wall 64 is connected to an aft end portion of the outer combustor wall 80 and an aft end portion of the inner combustor wall 82. With this arrangement, the combustor case walls 64, 80 and 82 collectively form peripheral boundaries of the combustion chamber 60 within the combustor 58.

The inner turbine wall 84 may be wrapped around a downstream end portion of the inner combustor wall 82. An upstream portion of the inner turbine wall 84 of FIG. 2 (e.g., the inner platform 98), for example, circumscribes and axially overlaps the downstream end portion of the inner combustor wall 82. This upstream portion extends axially along the axial centerline 22 (in the aft-to-forward direction) to a turning portion of the inner turbine wall 84. A downstream portion of the inner turbine wall 84 projects axially (in the forward-to-aft direction) away from the inner turbine wall turning portion to the exhaust wall 90. The inner turbine wall 84 is circumscribed and axially overlapped by the combustor 58 and its inner combustor wall 82. The inner turbine wall 84 is also spaced radially inboard from the combustor 58 and its inner combustor wall 82. The inner turbine wall 84 of FIG. 2 forms an inner peripheral boundary of the plenum 66, where the combustor 58 is disposed within and is substantially surrounded by the plenum 66. The inner turbine wall 84 forms an outer peripheral boundary of the core flowpath 28 within a (e.g., downstream) portion of the turbine section 35. The inner turbine wall 84 of FIG. 2 also circumscribes, axially overlaps and thereby houses a (e.g., downstream) portion of the turbine rotor 52.

Figure 3B:
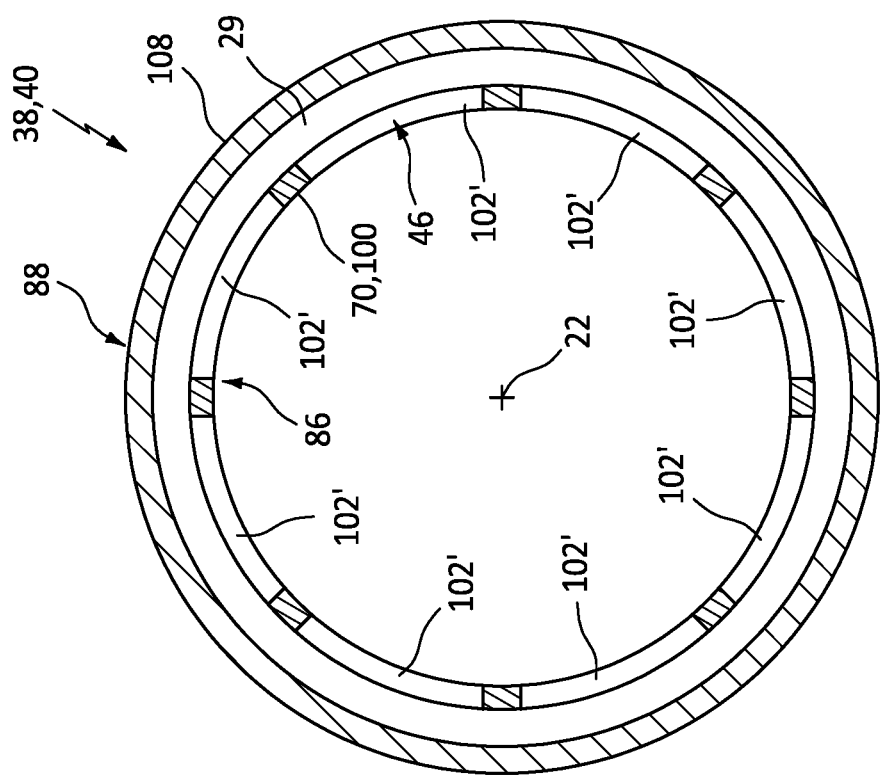
FIGS. 3A and 3B are cross-sectional illustrations of a bypass duct at an inlet with various inlet aperture arrangements.
Figure 3A:
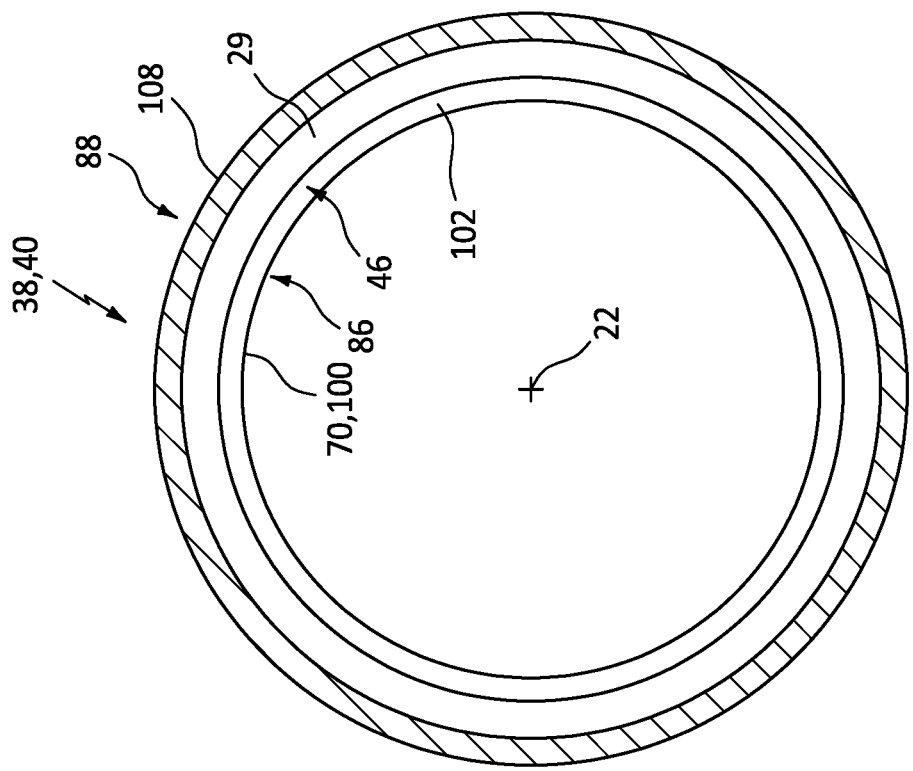

The inner bypass wall 86 forms an inner peripheral boundary of the bypass flowpath 29 within the stationary structure 38, outside of the engine core. This inner bypass wall 86 may extend from the bypass inlet 46 to the bypass exhaust 48. The inner bypass wall 86 of FIG. 2, for example, includes an aft, downstream section 100 of the compressor wall 70, the outer diffuser wall 72, the plenum side wall 76 and the plenum end wall 78. Referring to FIG. 3A, the bypass inlet 46 may be configured from a single inlet aperture 102 through the compressor wall 70. This inlet aperture 102 may be an annular slot which extends circumferentially (e.g., uninterrupted) completely around the axial centerline 22. Alternatively, referring to FIG. 3B, the bypass inlet 46 may be configured from one or more inlet apertures 102' through the compressor wall 70. Each of these inlet apertures 102' may be an arcuate slot which extends circumferentially (e.g., uninterrupted) partially about the axial centerline 22.

Referring to FIG. 2, the bypass inlet 46 may be disposed at an intermediate (e.g., axial midpoint) location along the compressor section 33 and its compressor rotor 50. However, in other embodiments, the bypass inlet 46 may be disposed at an aft, downstream end of the compressor rotor 50, or may be spaced aft, downstream of the compressor rotor 50 along the core flowpath 28. In still other embodiments, the bypass inlet may be disposed at a forward, upstream end of the compressor rotor 50, or may be spaced forward, upstream of the compressor rotor 50 along the core flowpath 28. The bypass duct 40 and its bypass flowpath 29 may thereby receive (e.g., bleed) the core air from the core flowpath 28 at various locations along the core flowpath 28.

The outer bypass wall 88 forms an outer peripheral boundary of the bypass flowpath 29 within the stationary structure 38, outside of the engine core. This outer bypass wall 88 may extend from the bypass inlet 46 to the bypass exhaust 48. The outer bypass wall 88 of FIG. 2 circumscribes and axially overlaps (e.g., an entirety of) the inner bypass wall 86. The outer bypass wall 88 is spaced radially outward from the inner bypass wall 86, thereby forming the (e.g., annular) bypass flowpath 29 radially between the inner bypass wall 86 and the outer bypass wall 88.

The bypass duct 40 and its bypass flowpath 29 of FIG. 2 are configured with a forward, upstream section 104 and an aft, downstream section 106. The bypass upstream section 104 includes the downstream section 100 of the compressor wall 70 and a forward, upstream section 108 of the outer bypass wall 88. This bypass upstream section 104 forms the bypass inlet 46. The bypass upstream section 104 may be radially outboard of and axially overlaps the compressor rotor 50. The bypass downstream section 106 includes the outer diffuser wall 72, the plenum side wall 76, the plenum end wall 78 and an aft, downstream section 110 of the outer bypass wall 88. This bypass downstream section 106 forms the bypass exhaust 48. The bypass downstream section 106 may be radially outboard of and axially overlap any one or more or all of the engine elements 52, 58, 64, 72, 74, 76, 78, 80, 82 and/or 84.

The exhaust duct 92 and its exhaust wall 90 are connected to the bypass duct 40 at the bypass exhaust 48. The exhaust wall 90 of FIG. 1, in particular, is connected to the outer bypass wall 88 and its downstream section 110. This exhaust wall 90 of FIG. 1 projects axially out from the bypass duct 40 and its outer bypass wall 88 to the aft engine exhaust 26.

Referring to FIG. 2, the stationary structure 38 may include one or more internal support structures with one or more support members. Examples of the support members include, but are not limited to, struts, structural guide vanes, bearing supports, bearing compartment walls, etc. The stationary structure 38 of FIG. 2, for example, includes a forward support structure to support the forward bearing 56A and an aft support structure to support the aft bearing 56B. The stationary structure 38 of FIG. 2 also includes an inlet nozzle 112, a diffuser nozzle 114 and the turbine nozzle 96.

The inlet nozzle 112 may be configured to condition the core air entering the compressor section 33. The inlet nozzle 112 of FIG. 2, for example, includes one or more inlet guide vanes 116 configured to impart swirl to the core air. These inlet guide vanes 116 are arranged circumferentially about the axial centerline 22 in an annular array. Each of the inlet guide vanes 116 extends radially across the core flowpath 28.

The diffuser nozzle 114 may be configured to condition the core air leaving the compressor section 33 and entering the plenum 66. The diffuser nozzle 114 of FIG. 2, for example, includes one or more diffuser guide vanes 118 configured to impart swirl to the core air. These diffuser guide vanes 118 are arranged circumferentially about the axial centerline 22 in an annular array. Each of the diffuser guide vanes 118 extends radially across the core flowpath 28. More particularly, each of the diffuser guide vanes 118 extends radially between and is connected to the inner diffuser wall 74 and the outer diffuser wall 72.

The turbine nozzle 96 may be configured to condition the combustion products exiting the combustor 58 and its combustion chamber 60. The turbine nozzle 96 of FIG. 2, for example, includes one or more turbine guide vanes 120 configured to impart swirl to the combustion products. These turbine guide vanes 120 are arranged circumferentially about the axial centerline 22 in an annular array. Each of the turbine guide vanes 120 extends radially across the core flowpath 28. More particularly, each of the turbine guide vanes 120 extends radially between and is connected to the turbine nozzle outer and inner platforms 94 and 98.

The stationary structure 38 of FIG. 1 includes and is configured from a plurality of discrete sections; e.g., engine sub-structures. The stationary structure 38 of FIG. 1, for example, includes a forward, upstream section 122 and an aft, downstream section 124. Referring to FIG. 2, the structure upstream section 122 may include an entirety (or at least a portion) of any one or more or all of the engine structure elements 32, 70, 100, and/or 112. The structure upstream section 122 of FIG. 2 also includes the bypass upstream section 104. The structure downstream section 124 may include an entirety (or at least a portion) of any one or more or all of the engine structure elements 58, 64, 68, 72, 74, 76, 78, 80, 82, 84, 90, 96 and/or 114; see also FIG. 1. The structure downstream section 124 of FIG. 2 also includes the bypass downstream section 106.

The structure upstream section 122 and/or the structure downstream section 124 may each be formed as a monolithic body. Herein, the term "monolithic" may describe an apparatus which is formed as a single unitary body. Each structure section 122, 124, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another.

An aft, downstream end of the structure upstream section 122 is mated with and connected to a forward, upstream end of the structure downstream section 124. The structure upstream section 122 of FIG. 2, for example, is attached to the structure downstream section 124 by at least one mechanical joint; e.g., a bolted flange connection. However, in other embodiments, the structure upstream section 122 may also or alternatively be attached to the structure downstream section 124 by at least one bond joint; e.g., a braze connection, a welded connection, etc.

Figure 4A:
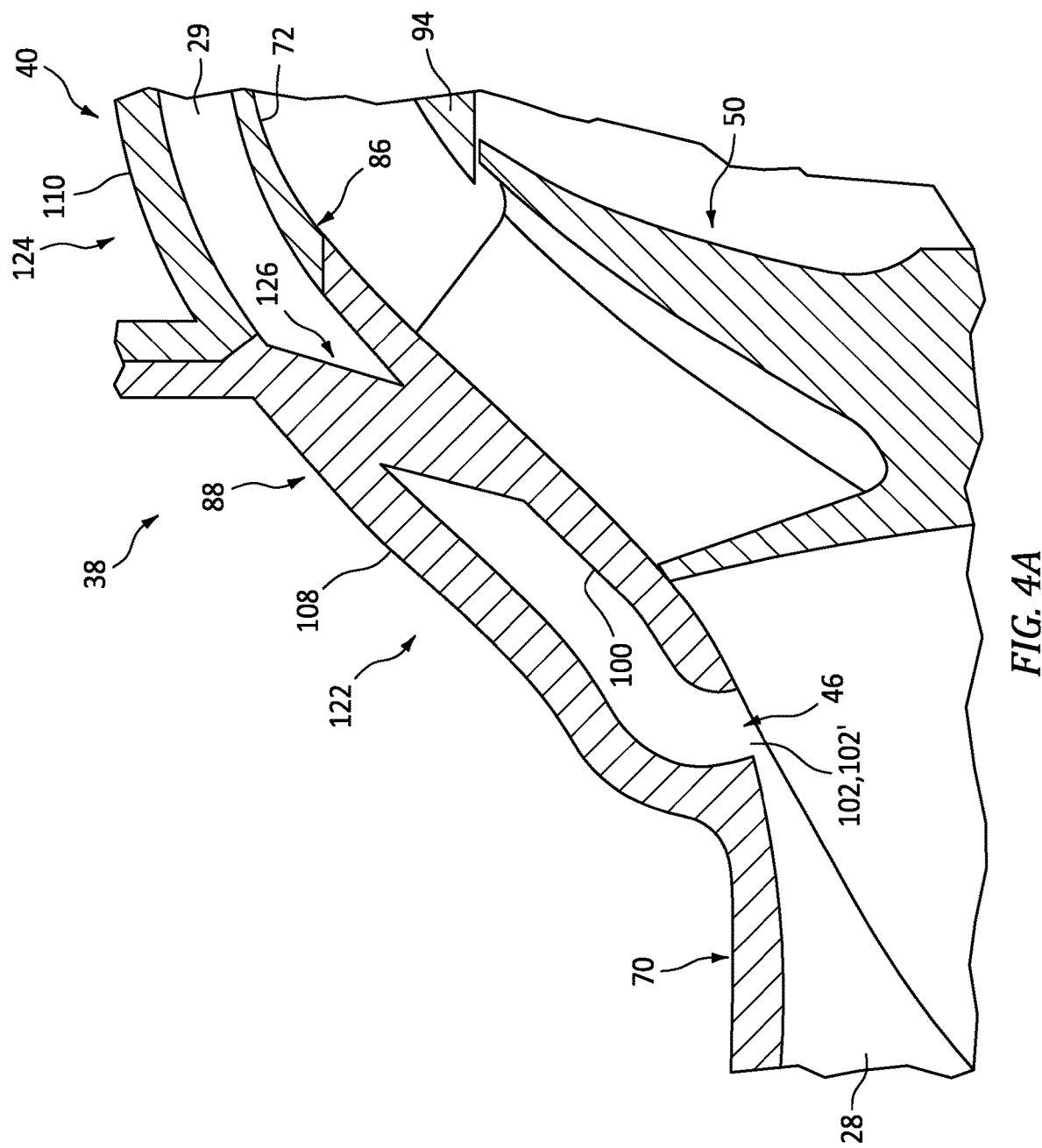
FIGS. 4A and 4B are partial side sectional illustrations of the gas turbine engine at the bypass duct inlet with various inner duct wall support arrangements.
Figure 4B:
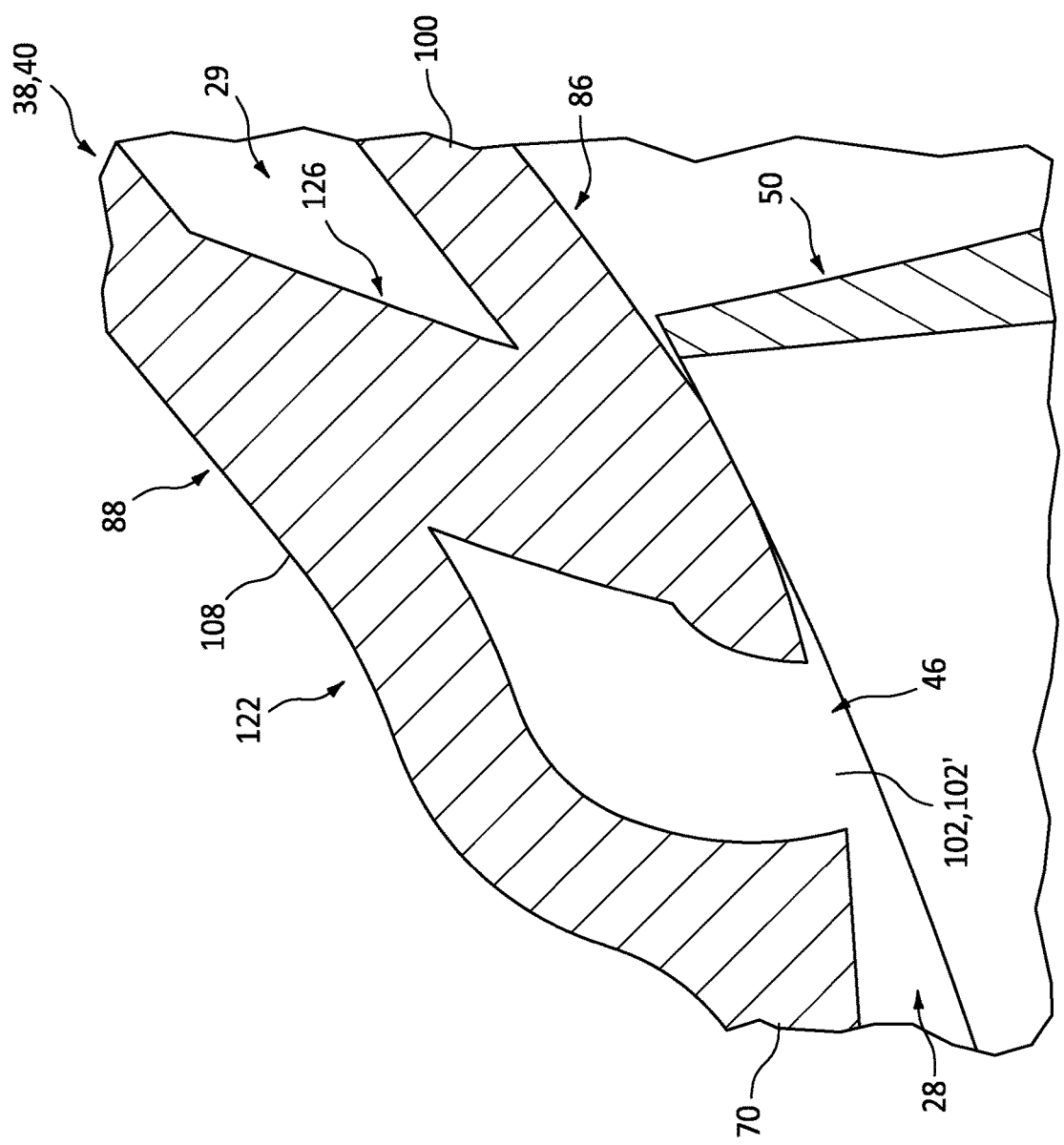

In some embodiments, referring to FIGS. 4A and 4B, the structure upstream section 122 may include one or more supports 126 for the downstream section 100 of the compressor wall 70; e.g., a forward, upstream section of the inner bypass wall 86. These supports 126 may be arranged circumferentially about the axial centerline 22 in an annular array. Each of the supports 126 extends across the bypass flowpath 29 from the downstream section 100 of the compressor wall 70 to the upstream section 108 of the outer bypass wall 88. The supports 126 may thereby locate and structurally support the downstream section 100 of the compressor wall 70. One or more of the supports 126 may be configured as a strut and/or an airfoil; e.g., a structural vane or guide vane. Referring to FIG. 4A, the supports 126 may be arranged at (e.g., on, adjacent or proximate) the bypass inlet 46. Referring to FIG. 4B, the supports 126 may alternatively be setback from the bypass inlet 46; e.g., at an aft, downstream end of the bypass upstream section 122. Such a setback arrangement may reduce potential losses through the bypass inlet 46.

Figure 5B:
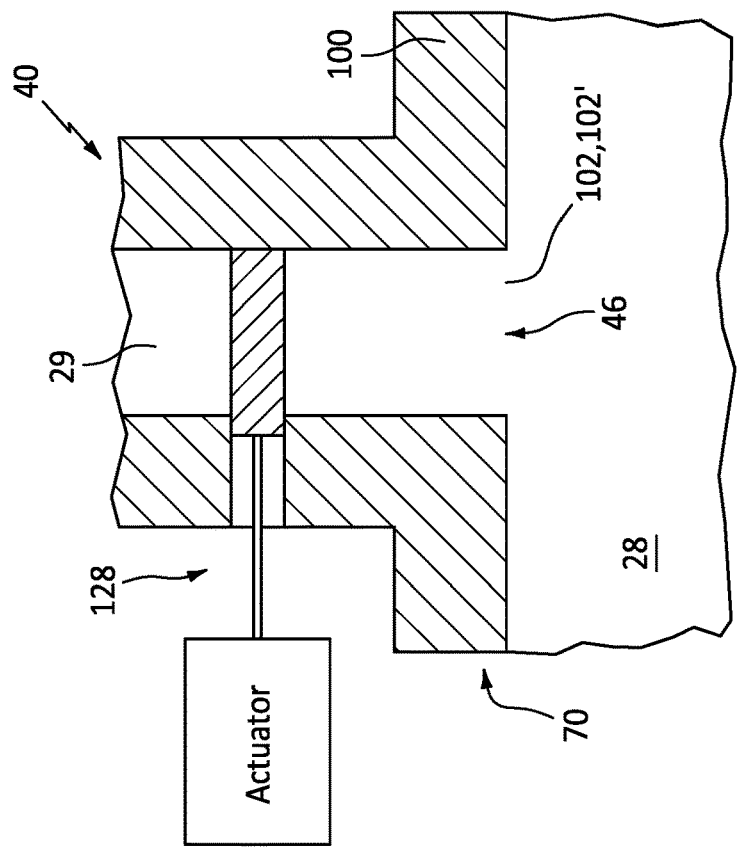
FIGS. 5A and 5B are partial schematic sectional illustrations of the gas turbine engine at the bypass duct inlet with a flow regulator for the bypass duct in various positions.
Figure 5A:
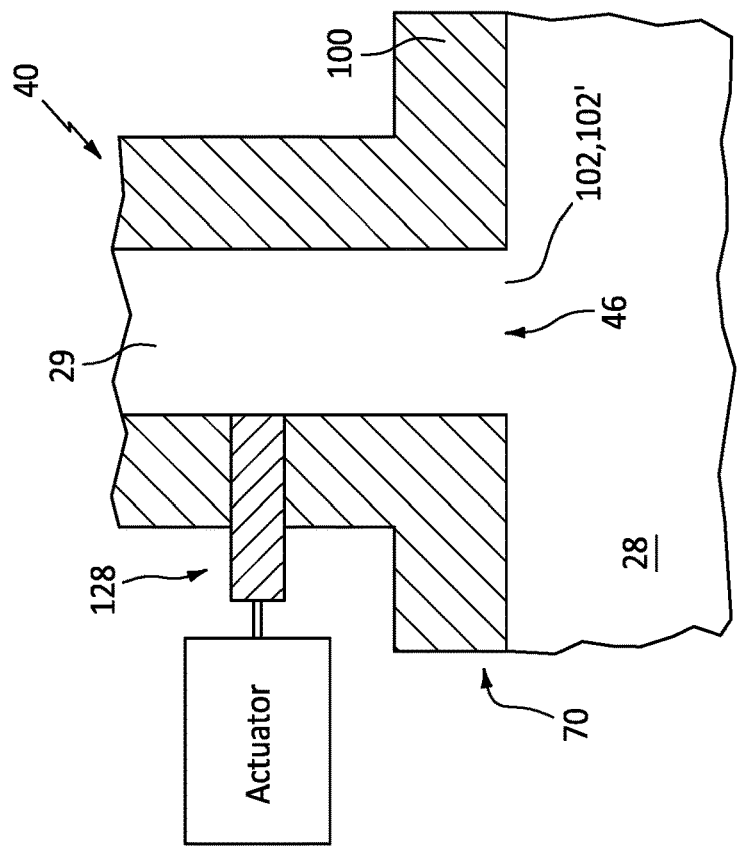

In some embodiments, referring to FIGS. 5A and 5B, the bypass duct 40 and its bypass flowpath 29 may be configured with a bypass flow regulator 128 (schematically shown). This flow regulator 128 may be disposed at (e.g., on, adjacent or proximate) the bypass inlet 46. The flow regulator 128 is configured to regulate (e.g., control) gas flow from the core flowpath 28 into the bypass flowpath 29 through the bypass inlet 46. The flow regulator 128, for example, may be configured as or otherwise includes one or more valves, one or more pivoting blocker doors, one or more translating blocker doors, etc.

Referring to FIG. 5A, during a first (e.g., high efficiency/long range) mode of operation, the flow regulator 128 may (e.g., completely) open such that a relatively large volume of the (e.g., partially) compressed core air is directed (e.g., bled) from the core flowpath 28 into the bypass flowpath 29. This first mode of operation may facilitate increased fuel efficiency for the gas turbine engine 20 and, thus, extended mission range for the aircraft. Referring to FIG. 5B, during a second (e.g., high thrust) mode of operation, the flow regulator 128 may (e.g., completely) close such that relatively little or none of the (e.g., partially) compressed core air is directed from the core flowpath 28 into the bypass flowpath 29. This second mode of operation may facilitate increased thrust output from the gas turbine engine 20. In other embodiments, however, the flow regulator 128 may alternatively permit a certain (e.g., minimum) volume of the (e.g., partially) compressed core air to flow into the bypass flowpath 29 during the second mode of operation. In addition or alternatively, the flow regulator 128 may partially open/partially close during an optional third mode of operation to permit an intermediate volume of the (e.g., partially) compressed core air to flow into the bypass flowpath 29.

Figure 6:
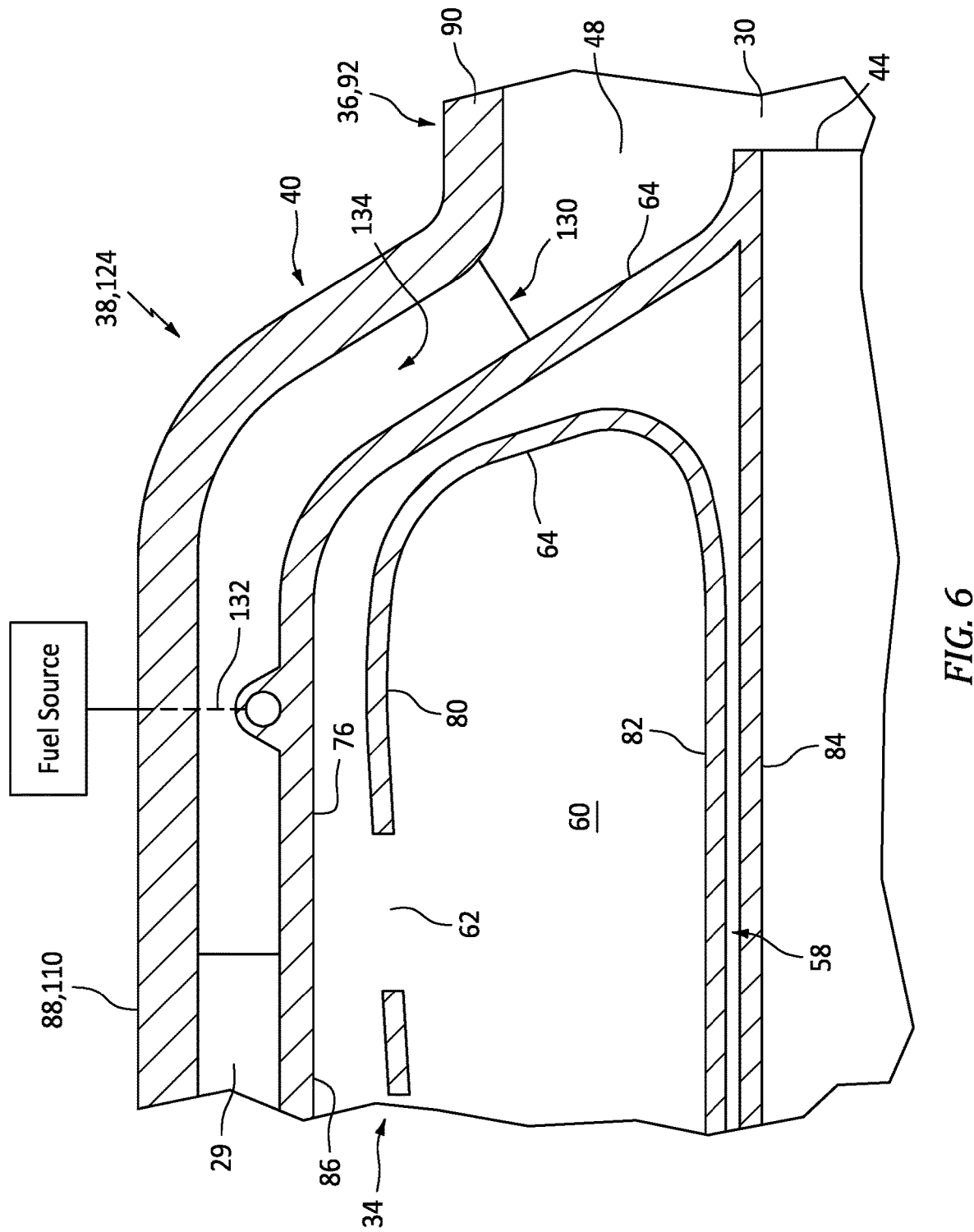
FIG. 6 is a schematic side sectional illustration of a portion of the gas turbine engine with support(s) between inner and outer walls of the bypass duct.
Figure 7:
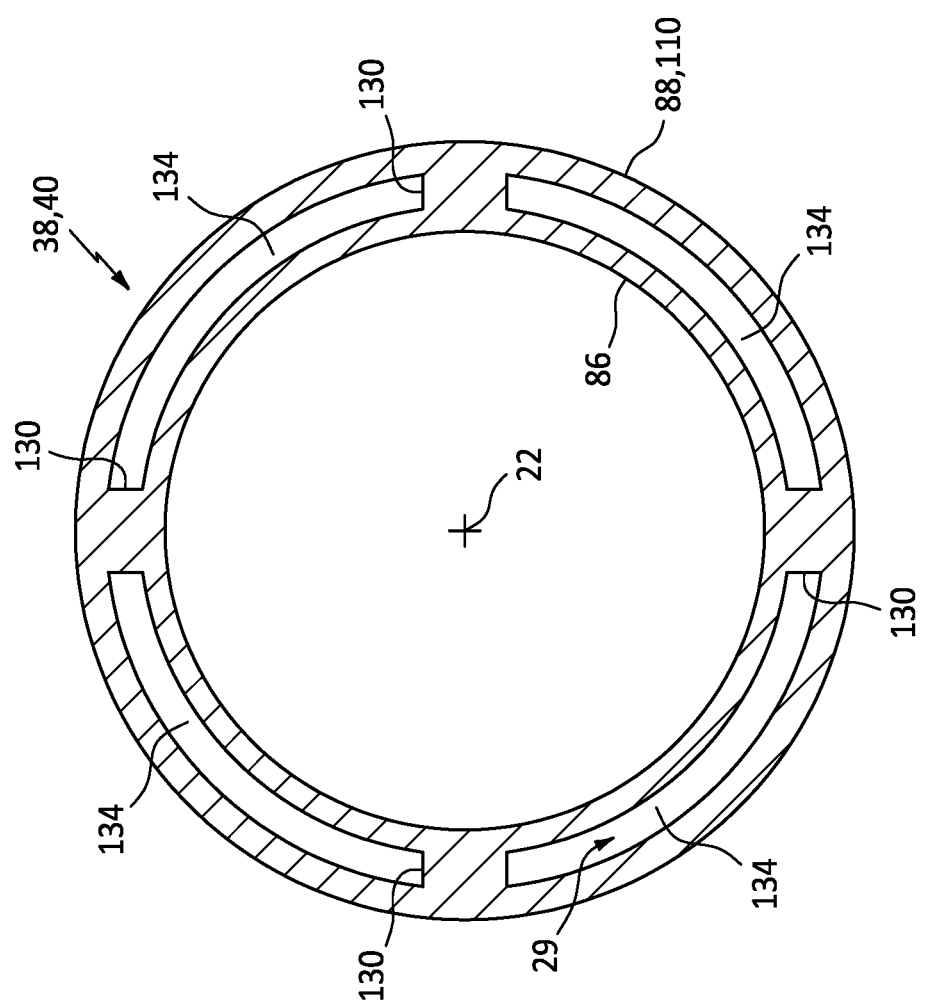
FIG. 7 is a cross-sectional illustration of the bypass duct with the supports of FIG. 6.

In some embodiments, referring to FIG. 6, the structure downstream section 124 may include one or more supports 130. These supports 130 may be arranged circumferentially about the axial centerline 22 in an annular array; see also FIG. 7. Each of the supports 130 extends across the bypass flowpath 29 from a downstream section of the inner bypass wall 86 (e.g., walls 64 and/or 76) to the downstream section 110 of the outer bypass wall 88. The supports 130 may thereby locate and structurally support the walls 86 and 88 relative to one another. One or more of the supports 130 may be configured as a strut and/or an airfoil. One or more of these supports 130 may also provide a path across the bypass flowpath 29 for one or more service lines; e.g., fuel lines, lubricant lines, etc. Each support 130, for example, may include an internal passage 132 (e.g., a bore) for directing fuel to an internal fuel injection system for the combustor 58. Referring to FIG. 7, the supports 130 may be arranged at or about the bypass exhaust 48. The supports 130 may thereby divide the bypass flowpath 29 into a plurality of channels 134 at the bypass exhaust 48.

Figure 8:
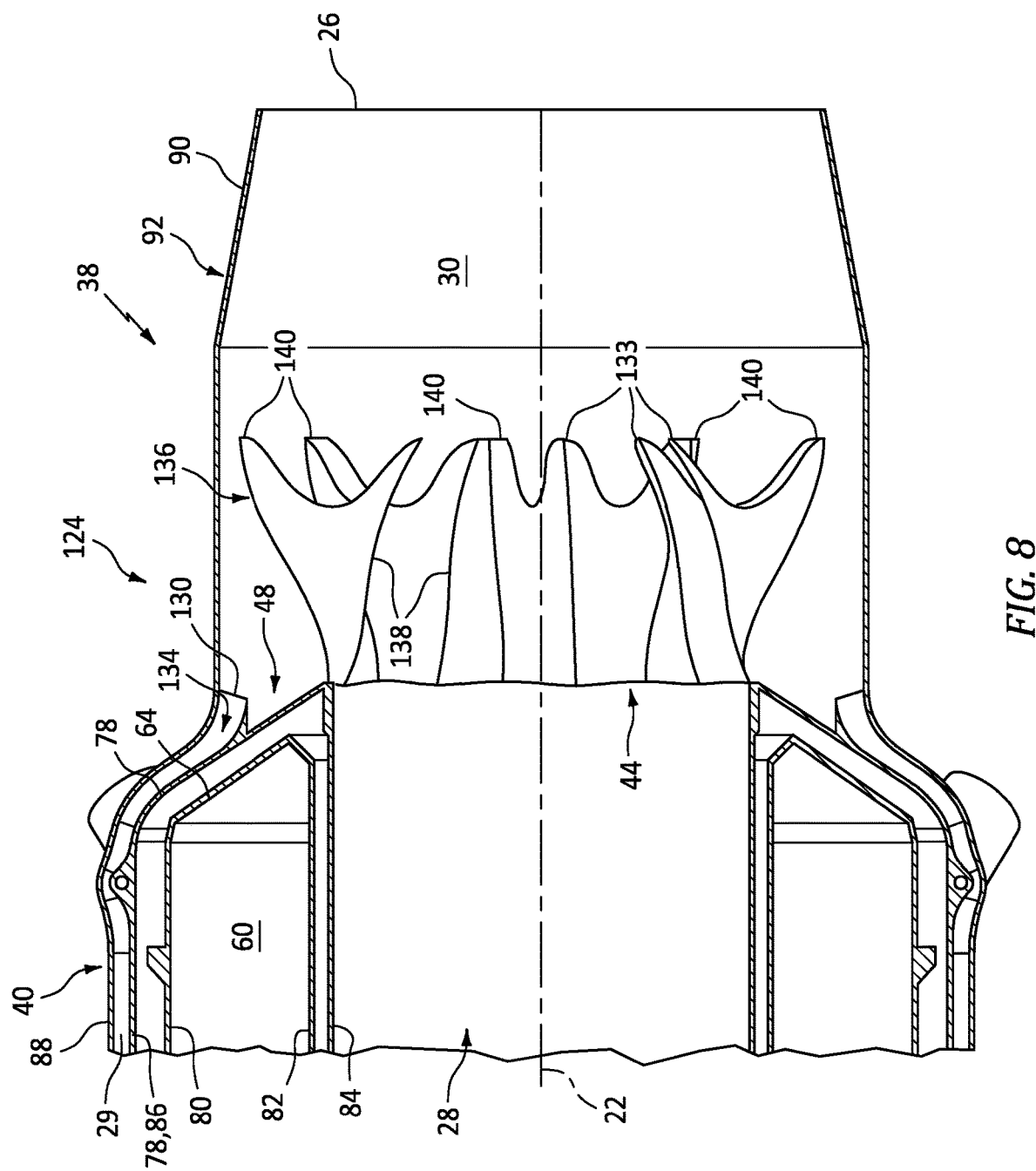
FIG. 8 is a side sectional illustration of a portion of the gas turbine engine with an exhaust mixer.

In some embodiments, referring to FIG. 8, the exhaust section 36 may include an exhaust mixer 136. This mixer 136 is disposed within the exhaust duct 92 and its exhaust flowpath 30. The mixer 136 of FIG. 8 is formed part of the structure downstream section 124, and may be connected to the inner turbine wall 84 and/or the plenum end wall 78; e.g., the inner bypass wall 86. The mixer 136 is arranged at an interface/intersection between the core exhaust 44 and the bypass exhaust 48. The mixer 136, for example, is at a location where the core flowpath 28 and the bypass flowpath 29 converge together into the exhaust flowpath 30. The mixer 136 is configured to facilitate mixing of the combustion products exhausted from the core exhaust 44 with the bypass air exhausted from the bypass exhaust 48 within the exhaust flowpath 30. The mixer 136 of FIG. 8, for example, is configured as a lobed mixer. This mixer 136 includes one or more inner lobes 138 and one or more outer lobes 140 interspersed with the inner lobes 138. Each of the inner lobes 138 projects radially inward within the exhaust flowpath 30 towards the axial centerline 22. Each of the outer lobes 140 projects radially outward within the exhaust flowpath 30 away from the axial centerline 22. The mixer 136 and each of its lobes 138, 140 may be spaced radially inward from the exhaust duct 92. The mixer 136 may thereby be cantilevered off of the inner turbine wall 84 and/or the plenum end wall 78; e.g., the inner bypass wall 86.

The gas turbine engine 20 is described above as a single spool, radial-flow turbojet gas turbine engine for ease of description. The present disclosure, however, is not limited to such an exemplary gas turbine engine. The gas turbine engine 20, for example, may alternatively be configured as an axial flow gas turbine engine. The gas turbine engine 20 may be configured as a direct drive gas turbine engine. The gas turbine engine 20 may alternatively include a gear train that connects one or more rotors together such that the rotors rotate at different speeds. The gas turbine engine 20 may be configured with a single spool (e.g., see FIG. 1), two spools, or with more than two spools. The gas turbine engine 20 may be configured as a turbofan engine, a turbojet engine, a propfan engine, a pusher fan engine or any other type of turbine engine. In addition, while the gas turbine engine 20 is described above with an exemplary reverse flow annular combustor, the gas turbine engine 20 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A reverse flow gas turbine engine, comprising:
   an engine core including a compressor section, a combustor section, a turbine section and a core flowpath, the compressor section comprising a radial flow compressor rotor having a radial flow compressor rotor, and the core flowpath extending longitudinally through the compressor section, the combustor section and the turbine section from a core inlet to a core exhaust;
   a bypass duct comprising a bypass flowpath that extends outside of the engine core from a bypass inlet to a bypass exhaust, the bypass inlet disposed along the compressor section and fluidly coupled with the core flowpath; and
   a stationary structure forming an outer peripheral boundary wall of the core flowpath within the compressor section, the outer peripheral boundary wall extending radially outside of the radial flow compressor rotor, the bypass inlet comprising an annular aperture extending longitudinally along the outer peripheral boundary wall, the bypass inlet located in the outer peripheral boundary wall above the radial flow compressor rotor to allow radial flow from the radial flow compressor rotor to enter into the bypass duct through the bypass inlet.

2. A reverse flow gas turbine engine with an axial centerline, comprising:
   an engine core including a compressor section, a combustor section, a turbine section and a core flowpath, the compressor section comprising a radial flow compressor rotor, and the core flowpath extending through the compressor section, the combustor section and the turbine section from a core inlet to a core exhaust;
   a bypass duct comprising a bypass flowpath that extends outside of the engine core from a bypass inlet to a bypass exhaust, the bypass inlet disposed along the compressor section and fluidly coupled with the core flowpath; and
   a wall forming an outer peripheral boundary of the core flowpath within the compressor section, the wall extending radially outboard of the radial flow compressor rotor, the bypass inlet comprising an arcuate slot, and the arcuate slot extending through the wall and circumferentially within the wall partially about the axial centerline and above the radial flow compressor rotor to allow radial flow from the radial flow compressor rotor to enter into the bypass duct through the bypass inlet.

3. The reverse flow gas turbine engine of claim 1, wherein the annular aperture comprises an annular slot extending through the outer peripheral boundary wall.

4. The reverse flow gas turbine engine of claim 1, further comprising a flow regulator configured to regulate gas flow from the core flowpath into the bypass flowpath.

5. The reverse flow gas turbine engine of claim 4, wherein the flow regulator is arranged at the bypass inlet.

6. The reverse flow gas turbine engine of claim 1, wherein the bypass flowpath bypasses the combustor section and the turbine section.

7. The reverse flow gas turbine engine of claim 1, further comprising an exhaust duct fluidly coupled with and downstream of the core exhaust and the bypass exhaust.

8. The reverse flow gas turbine engine of claim 7, further comprising a lobed mixer within the exhaust duct at an interface between the core exhaust and the bypass exhaust.

9. The reverse flow gas turbine engine of claim 1, wherein at least one of the combustor section comprises a reverse flow combustor; or the turbine section comprises a radial flow turbine rotor.

10. The reverse flow gas turbine engine of claim 1, further comprising a monolithic body including: a diffuser between the compressor section and the combustor section; a combustor within the combustor section; a nozzle between the combustor section and the turbine section; and at least a section of the bypass duct radially outboard of the diffuser, the combustor and the nozzle.

11. The reverse flow gas turbine engine of claim 10, wherein the monolithic body further includes a lobe mixer at an interface between the core exhaust and the bypass exhaust.

12. The reverse flow gas turbine engine of claim 10, wherein the turbine section comprises a turbine rotor; and the monolithic body further includes a turbine wall at least partially housing the turbine rotor.

13. The reverse flow gas turbine engine of claim 10, further comprising a second monolithic body including: an inlet structure forming the core inlet; a compressor wall at least partially housing the radial flow compressor rotor; and a second section of the bypass duct radially outboard of the compressor wall.

14. An assembly for a reverse flow gas turbine engine, comprising:
   an engine core including a compressor section, a combustor section, a turbine section and a core flowpath, the compressor section comprising a radial flow compressor rotor, the core flowpath extending longitudinally through the compressor section, the combustor section and the turbine section from a core inlet to a core exhaust; and
   a stationary structure including a combustor, a bypass duct and an outer peripheral boundary wall of the core flowpath within the compressor section, the outer peripheral boundary wall extending radially outside of the radial flow compressor rotor, the combustor within the combustor section, the bypass duct comprising a bypass flowpath that extends outside of the engine core from a bypass inlet to a bypass exhaust, the bypass inlet disposed longitudinally along and fluidly coupled with core flowpath, and the bypass inlet comprising an annular aperture extending longitudinally along the outer peripheral boundary wall and located in the outer peripheral boundary wall above the radial flow compressor rotor to allow radial flow from the radial flow compressor rotor to enter to bypass duct through the bypass inlet;
   at least a section of the stationary structure formed as a monolithic body, the section of the stationary structure including the combustor and at least a section of the bypass duct axially overlapping the combustor.

15. The assembly of claim 14, wherein the section of the stationary structure further includes:
   a diffuser between the compressor section and the combustor section; and
   a nozzle between the combustor section and the turbine section.

16. The assembly of claim 14, wherein the section of the stationary structure further includes:
   an exhaust duct fluidly coupled with and downstream of the core flowpath and the bypass flowpath; and a mixer at an interface between the core exhaust and the bypass exhaust.

17. The assembly of claim 14, wherein a second section of the stationary structure is formed as a second monolithic body, and the second section of the stationary structure includes an inlet structure forming the core inlet; a compressor wall at least partially housing the radial flow compressor rotor within the compressor section; and a second section of the bypass duct axially overlapping the compressor wall.

18. The assembly of claim 14, wherein the bypass inlet is disposed along the compressor section.

19. The reverse flow gas turbine engine of claim 2, further comprising: a stationary structure including a combustor, the bypass duct, the wall and a lobed mixer, the combustor within the combustor section, and the mixer arranged at an interface between the core exhaust and the bypass exhaust; at least a section of the stationary structure formed as a monolithic body, the section of the stationary structure including the combustor and the lobed mixer.

* * * * *